(12) United States Patent  
Oberheide et al.

(10) Patent No.: US 10,009,344 B2  
(45) Date of Patent: Jun. 26, 2018

(54) SYSTEMS AND METHODS FOR ENDPOINT MANAGEMENT CLASSIFICATION

(71) Applicant: Duo Security, Inc., Ann Arbor, MI (US)

(72) Inventors: Jon Oberheide, Ann Arbor, MI (US); Adam Goodman, Ann Arbor, MI (US); Michael Hanley, Ann Arbor, MI (US); Peter Johnson, Ann Arbor, MI (US); Omar Abduljaber, Ann Arbor, MI (US); James Barclay, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days. days.

(21) Appl. No.: 15/626,421

(22) Filed: Jun. 19, 2017

(65) Prior Publication Data

US 2018/0007046 A1    Jan. 4, 2018

Related U.S. Application Data

(60) Provisional application No. 62/356,075, filed on Jun. 29, 2016.

(51) Int. Cl.
*H04L 29/06* (2006.01)
*H04W 12/06* (2009.01)
(Continued)

(52) U.S. Cl.
CPC ........ *H04L 63/0876* (2013.01); *H04L 63/101* (2013.01); *H04L 63/102* (2013.01);
(Continued)

(58) Field of Classification Search
CPC . H04L 63/0876; H04L 63/101; H04L 63/102; H04L 63/08; H04W 12/06; H04W 12/08; G06F 21/62

See application file for complete search history.

(56) References Cited

U.S. PATENT DOCUMENTS

| | | | | | |
|---|---|---|---|---|---|
| 5,754,763 | A | * | 5/1998 | Bereiter | G06F 21/10 705/59 |
| 6,662,205 | B1 | * | 12/2003 | Bereiter | G06F 9/445 709/201 |

(Continued)

FOREIGN PATENT DOCUMENTS

| WO | WO 2007075850 A2 * | 7/2007 | ........... G06F 21/577 |
|---|---|---|---|
| WO | 150073 | 9/2014 | |

*Primary Examiner* — Joseph P Hirl
*Assistant Examiner* — J. Brant Murphy
(74) *Attorney, Agent, or Firm* — Jeffrey Schox; Padowithz Alce

(57) ABSTRACT

A system and method for mitigating security vulnerabilities of a computer network by detecting a management status of an endpoint computing device attempting to authenticate to one or more computing resources accessible via the computer network includes: detecting an authentication attempt by the endpoint computing device to the computer network; during the authentication attempt, collecting management status indicia from the endpoint computing device, wherein the management status indicia comprise data used to determine a management status of the endpoint computing device; using the management status indicia to identify the management status of the endpoint computing device and identifying the management status of the endpoint computing device; and controlling access to the computer network based on (a) whether the authentication attempt by the endpoint computing device is successful and (b) the identified management status of the endpoint computing device.

18 Claims, 4 Drawing Sheets

100

Detecting an Authentication Attempt S110

Determining Endpoint Management Status S120

Transmitting Endpoint Management Status Data S130

Implementing Protective Protocols S140

(51) Int. Cl.
*H04W 12/08* (2009.01)
*G06F 21/62* (2013.01)

(52) U.S. Cl.
CPC ............ *H04W 12/06* (2013.01); *G06F 21/62* (2013.01); *H04L 63/08* (2013.01); *H04W 12/08* (2013.01)

(56) References Cited

U.S. PATENT DOCUMENTS

| | | | |
|---|---|---|---|
| 8,806,638 B1* | 8/2014 | Mani | H04L 63/0227 726/24 |
| 8,838,759 B1* | 9/2014 | Eatough | H04L 41/085 709/223 |
| 8,850,017 B2 | 9/2014 | Ebrahimi et al. | |
| 8,850,530 B2 | 9/2014 | Shahbazi | |
| 8,938,799 B2* | 1/2015 | Kuo | G06F 21/604 713/165 |
| 9,077,758 B1* | 7/2015 | McGovern | H04L 63/14 |
| 9,172,545 B2 | 10/2015 | Edstrom et al. | |
| 9,344,275 B2 | 5/2016 | Bar-El et al. | |
| 9,544,143 B2 | 1/2017 | Oberheide et al. | |
| 9,723,019 B1* | 8/2017 | Rathor | H04L 63/20 |
| 9,832,221 B1* | 11/2017 | Newstadt | H04L 63/145 |
| 2003/0172291 A1* | 9/2003 | Judge | G06F 21/554 726/1 |
| 2003/0172294 A1* | 9/2003 | Judge | G06F 21/554 726/13 |
| 2005/0063377 A1* | 3/2005 | Bryant | H04L 43/18 370/389 |
| 2008/0040790 A1* | 2/2008 | Kuo | G06F 21/604 726/12 |
| 2008/0070495 A1* | 3/2008 | Stricklen | H04W 8/22 455/3.01 |
| 2009/0205011 A1* | 8/2009 | Jain | G06F 8/65 726/1 |
| 2009/0205012 A1* | 8/2009 | Jain | G06F 21/577 726/1 |
| 2010/0303240 A1* | 12/2010 | Beachem | G06F 21/57 380/277 |
| 2012/0317287 A1* | 12/2012 | Amitai | H04L 61/103 709/225 |
| 2013/0086657 A1* | 4/2013 | Srinivasan | H04L 63/10 726/6 |
| 2013/0254833 A1* | 9/2013 | Nicodemus | G06F 21/55 726/1 |
| 2014/0096215 A1* | 4/2014 | Hessler | H04L 63/0869 726/7 |
| 2014/0173025 A1* | 6/2014 | Killick | H04N 21/266 709/217 |
| 2014/0181893 A1* | 6/2014 | Von Bokern | H04L 63/0838 726/1 |
| 2014/0297840 A1* | 10/2014 | Qureshi | G06F 21/41 709/224 |
| 2014/0298420 A1* | 10/2014 | Barton | H04L 63/10 726/4 |
| 2014/0310415 A1* | 10/2014 | Kirner | H04L 41/082 709/225 |
| 2015/0046989 A1* | 2/2015 | Oberheide | G06F 21/44 726/6 |
| 2015/0127832 A1* | 5/2015 | Kirner | H04L 41/0893 709/225 |
| 2015/0146732 A1* | 5/2015 | Elmaliah | H04L 29/06 370/392 |
| 2015/0199213 A1* | 7/2015 | Desai | G06F 9/468 718/102 |
| 2015/0244699 A1* | 8/2015 | Hessler | G06F 21/44 726/7 |
| 2015/0326586 A1* | 11/2015 | Khesin | G06F 21/568 726/1 |
| 2016/0021117 A1 | 1/2016 | Harmon et al. | |
| 2016/0180343 A1 | 6/2016 | Poon et al. | |

* cited by examiner

SYSTEMS AND METHODS FOR ENDPOINT MANAGEMENT CLASSIFICATION

CROSS-REFERENCE TO RELATED APPLICATIONS

This application claims the benefit of U.S. Provisional Application No. 62/356,075, filed 29 Jun. 2016, which is incorporated in its entirety by this reference.

TECHNICAL FIELD

This invention relates generally to the computer security field, and more specifically to new and useful methods for endpoint management classification.

BACKGROUND

Endpoint management is a key strategy by which organizations limit cybersecurity vulnerability. By installing endpoint management software on devices, an organization's IT/security team may have visibility and enforcement of various security policies; e.g., requiring full-disk encryption, not requiring dangerous applications, automatically updating the endpoint devices, etc. Unfortunately, endpoint management is only a solution for endpoints that an organization is aware of (e.g., the endpoint includes some type of endpoint management agent or software.

It may be in many cases possible for unmanaged endpoints to receive access to an organization's network resources including data or applications of the organization; in traditional endpoint management systems, it may be extremely difficult or impossible to determine which endpoints are managed and which are not during authentication because, in most cases, the status of the unmanaged endpoints cannot be determined until after authentication and the unmanaged device has engaged an organization's network and/or other computing resources. This uncertainty, in turn, reduces organizational security.

Thus, there is a need in the computer security field to create new and useful methods for endpoint management classification. This invention provides such new and useful methods.

DESCRIPTION OF THE PREFERRED EMBODIMENTS

Figure 1:
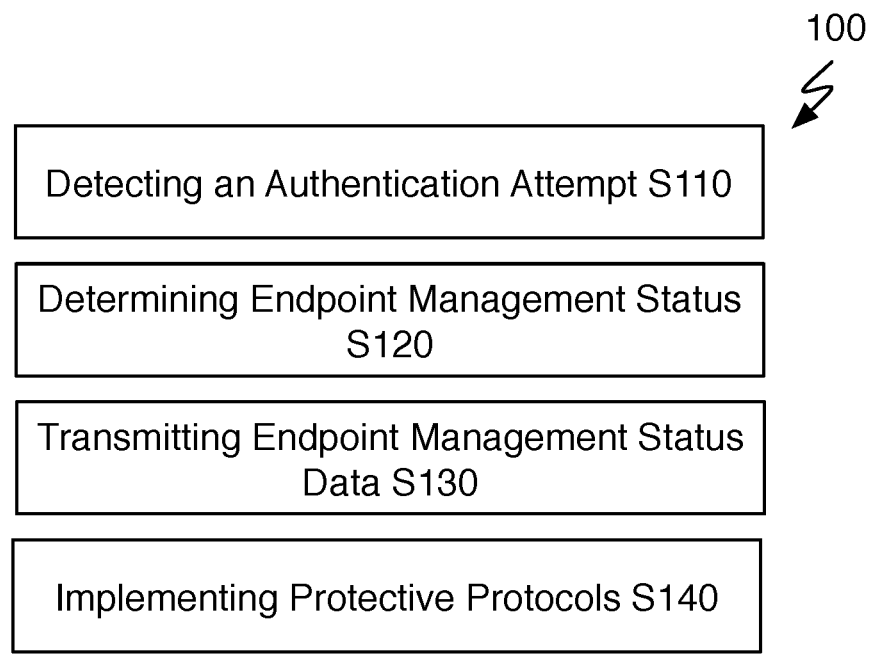
FIG. 1 is a chart view of a method of a preferred embodiment.

The following description of preferred embodiments of the invention is not intended to limit the invention to these preferred embodiments, but rather to enable any person skilled in the art to make and use this invention.
Overview
The systems and methods of the several embodiments of the present application generally function to mitigate and/or eliminate various computer security risks associated with unmanaged endpoints that seek to access digital resources of an entity.

As discussed, in part, in the background section, it may be difficult to impossible to determine by the organization whether unmanaged devices are accessing the digital resources of the organization. In basic terms, the organization typically have no visibility or ability to enforce whether a managed endpoint is used for accessing its resources. This difficultly often arises in these organizations due to remote employees using non-organization issued or authorized devices to access networks and/or other resources of the organization and even from onsite employees that use non-organization issued or authorized devices (e.g., mobile phones, wearable devices, etc.) to access and/or use organization digital resources. In the case that some of these user devices are not actively managed, this may present significant computer security risks because of vulnerabilities that may exist within the unmanaged user devices.

Accordingly, various embodiments of the present application function to allow an IT administrator or the like of an organization to view and/or recognize all managed and unmanaged endpoints that are accessing the systems of the organization. In addition, the embodiments of the present application function to allow an IT administrator to block/limit all or some of the unmanaged device from accessing the systems of the organization thereby mitigating or eliminating the computer security risks that these unmanaged devices may pose to the systems of the organization.

Additionally, the systems and methods described herein provide one or more signaling mechanism that may be used to determine whether an endpoint is managed or not when an endpoint attempts to access digital resources of an organization and when an endpoint attempts to or performs a login. The one or signaling mechanisms may be implemented between the endpoint, a security service provider, and the organization. The signaling mechanism functions to provide some indication to the security service provider and/or the organization about the management status of an endpoint from a signal from the signaling mechanism is provided. The signaling mechanism may include one or more types of management status indicia that can be used by the security service provider and/or the organization to verify or confirm the management status of the endpoint. The confirmed or verified management status of the endpoint may then be used to enable access, generated authentication requirements, and the like to the digital resources and/or networks of the organization.

1. Method for Endpoint Management Classification

A method 100 for endpoint management classification includes detecting an authentication attempt by an endpoint device S110, determining endpoint management status S110, and transmitting endpoint management status data S130, as shown in FIG. 1. Optionally, the method 100 includes, in response to determining an endpoint management status, initializing protective protocols S140 to reduce potential security vulnerabilities.

As discussed in the background section, the possibility of users of an organization's computer network using an unmanaged endpoint to access organization computing resources (e.g., network, data, computers, or applications), whether by result of a Bring-Your-Own-Device (BYOD) policy or simply due to use of unauthorized or unregistered endpoints by users, can pose a major security vulnerability, in that, any malicious applications, code, or other potential attack elements residing on the un-managed endpoint may have unrestricted access to the organization's computing resources.

The method 100 functions to enable, during the course of authentication (or immediately prior to or immediately after authentication), detection of an endpoint's management status; that is, whether the endpoint is managed or not (and potentially additional information describing the endpoint's management status) by a system, a computer network, or an organization (or by its associated service providers) in which the endpoint is attempting to authenticate to. The management status data can then be used by organizational service providers or identity providers (or other entities or a computer system) to enact security protocols and/or security policies in light of an endpoint's management status. For example, an organization may choose to set access policy that restricts or that does not allow un-managed endpoints to access a particular service. As a second example, an organization may choose to allow un-managed endpoints access in a more limited fashion than for managed endpoints. As a third example, an organization may choose to allow un-managed endpoints full access, but may monitor said endpoints (e.g., allowing a network administrator to ask a user why he or she continues to access confidential company data on the local public library's computers).

It shall be noted that while method 100 is preferably implemented contemporaneous with an authentication attempt of an endpoint, a variation of method 100 includes detecting the management status of an endpoint device at any instance including at or during authentication, after authentication, while the endpoint may be operating on an organizations network and the like. That is, in some instances authentication may not be required and thus, the capability of the method 100 to detect a management status of an endpoint may not be reliant on whether or not the endpoint performs an authentication. Accordingly, at any point outside of authentication, an organization or associated service provider may detect a management status of any endpoint that is in operable communication or otherwise, utilizes one or more network resources of the organization.

Figure 2:
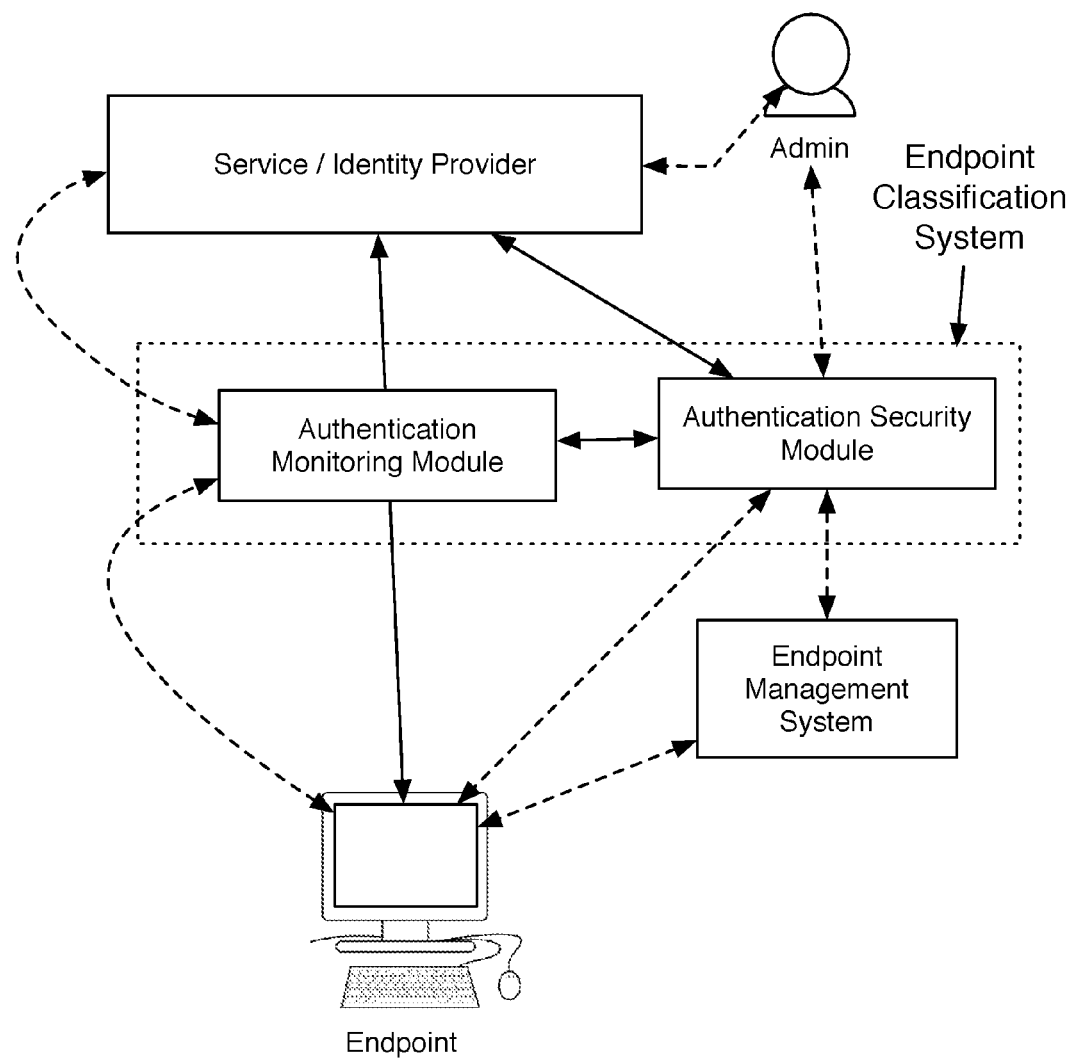
FIG. 2 is a diagram view of an endpoint classification system.

The method 100 is preferably implemented by an endpoint classification system such as the one shown in FIG. 2. The endpoint classification system preferably includes an authentication monitoring module (enabling monitoring of authentication attempts, as in S110) and an authentication security module (that determines endpoint management status for an endpoint, as in S120, and transmits related data to the authenticating authority, as in S130). The endpoint classification system may optionally include a security protocol implementation module that executes or implements one or more protective or security measures based on the endpoint management status.

The authentication monitoring module is preferably integrated, in part, with the service provider (or other entity), while the authentication security module is preferably operable on a remote server distinct from and independent of the service/identity provider and endpoint management system. Additionally, or alternatively, the endpoint classification may be implemented in any suitable computer system. However, it shall be noted that, while the authentication monitoring module may preferably be implemented independent and separate from the authentication security module, in one variation it is possible to implement both the authentication monitoring module and authentication security module within a single system and by a single provider.

While the method 100 is preferably implemented by an endpoint classification system as described above, the method 100 may additionally or alternatively be implemented by any suitable computer system capable of performing the method 100. For instance, the method 100 may be implemented by an endpoint management system that includes a primary computer and/or server that is able to communicate any endpoint in which there is management relationship between (e.g., management agent hosted by an endpoint that may be controlled by the management server). The endpoint management system may also be able to identify which, if any, endpoints operating or accessing an organization's resources, data, applications, computer networks, etc. that is not managed by the endpoint management system.

S110 includes detecting an authentication attempt. S110 functions to detect an authentication attempt initiated at an endpoint. The authentication attempt is preferably an authentication attempt with a service provider distinct from the system operating the method 100, but may additionally or alternatively be an authentication attempt with any entity (e.g., an identity provider distinct from the system operating the method 100, or a service/identity provider that integrates the system operating the method 100). Note that in the instance where the service/identity provider integrates the system operating the method 100, the service/identity provider may perform authentication according to endpoint management status data as part of the method 100.

The authentication attempt preferably includes submission, by the endpoint, of an authentication request the service provider (or other entity). In some embodiments, the authentication request may be originally submitted by the endpoint to the service provider (or other entity) then re-routed to system or entity performing method 100 for processing. The authentication requests preferably requests authentication for a transaction between a user and a service provider (or other entity). The transaction may be any event, transfer, action, or activity (e.g., involving a service provider) that requires authentication and/or authorization of an involved party (e.g., an authority agent). Exemplary transactions may include logging into a website, application or computer system; user initiating a "forgotten password" procedure; a payment exchange between two entities; a user attempting to perform a restricted action in a computer system; and/or any suitable application requiring authentication and/or authorization. While throughout this specification the method 100 refers to authentication, a person of ordinary skill in the art will recognize that the techniques of the method may additionally or alternatively be applied to perform authorization. Authentication preferably includes validating the identity of at least one involved party relevant to a transaction. Authorization preferably includes validating authority or permission of an entity to execute a transaction. For authentication, the possession factor preferably belongs to the authentic user for self-approval of transactions. For authorization, the possession factor preferably belongs to an authoritative user (e.g., an authority agent) that is preferably in charge of regulating transactions of a user involved in the transaction. The transactions are preferably initiated in an online environment, where parties may be communicating using a computing device or public (e.g., Internet)/private network, but the transactions may alternatively occur offline where parties may be interacting in the real world.

In one variation, S110 includes detecting an attempt to access a network or any computing resource (e.g., data, applications, servers, etc.) of an organization or identity provider. The attempt to access may include an access request provided by an endpoint device to a service provider or a gatekeeper of the network or computing resource. In some embodiments, the access request may not include an authentication request/authentication information or be accompanied by an authentication process involving the endpoint. That is, authentication of the endpoint or user of the endpoint may not be required. In some embodiments, based on the type of access the endpoint is requesting, authentication of the user and/or endpoint device may not be required. The access request, however, may include various information identifying the endpoint device and/or one or more specific networks, network resources, and/or computing resources that the endpoint is attempting to access or transaction that the endpoint is attempting to perform.

S110 preferably includes detecting an authentication attempt by monitoring authentication attempts for a given service provider (or other entity). Thus, S110 functions to detect an authentication attempt by actively monitoring the authentication attempts at or being received by the service provider. Additionally, or alternatively, S110 may include receiving an indication or a report of an authentication attempt to the service provider from the service provider or a suitable authentication agent associated with the service provider.

In a first implementation of a preferred embodiment, S110 includes collecting, at an inline frame (henceforth referred to as 'iframe') implemented within a web interface (of the service provider or other entity), authentication attempt data.

Collection of authentication attempt data through an iframe embedded in a website enables authentication attempt data to be captured whenever an endpoint user (or automated program running on an endpoint) interfaces with the website. For example, authentication attempt data can be collected at an iframe in response to the user interfacing with the web application through the endpoint user device. The iframe can be embedded in a web application (e.g., a website, an application accessible over the Internet, an application facilitating direct interfacing with the user in an interactive manner, etc.), a native application, and/or any suitable software. The iframe can include resources that are presentable in Silverlight, Flash, HTML 5, and/or any suitable media and/or multimedia player/plug-in. The iframe can include a block element such as a DIV, SPAN, or other HTML tag, embedded object, and/or any other suitable element.

While iframe collection preferably includes collecting data using an HTML iframe object, S110 may additionally or alternatively include any authentication attempt data collection through a web interface. For example, S110 may include performing an HTTP redirect to first send users desiring authentication to a site designed to collect authentication attempt data before allowing the user to continue with authentication.

The iframe is preferably embedded in a website used for authenticating a user for access to a service provider; for example, the iframe may be embedded in a website used to access a computer network from outside the physical network (e.g., via a VPN service). Using iframe for authentication data collection in a website required for service access ensures that devices accessing the service meet endpoint management standards (as described in later sections). Thus, implementing the iframe enables authentication as well as endpoint data collection contemporaneously, at a same time, or nearly simultaneously that allows for processing of the authentication data and determining an endpoint management status during the authentication attempt.

In a second implementation of a preferred embodiment, S110 includes collecting, using a proxy service, authentication attempt data. The proxy service preferably sits between the endpoint and the service provider (or other entity) and functions to monitor traffic passing through the proxy service to collect authentication attempt data. The proxy service may collect authentication attempt data via HTTP headers, but may additionally or alternatively collect authentication attempt data in additional ways; for example, proxy collection may include collecting data on network traffic passing through the proxy, which may be used to detect authentication attempts.

Alternatively, S110 may include detecting an authentication attempt by receiving notification of the authentication attempt or access attempt from the service provider (or other entity) for which authentication is desired. For example, in response to identifying an authentication attempt by an endpoint, a service provider may automatically notify the system operating the method 100 that an authentication attempt or access attempt has occurred. Thus, the authentication attempt may act as a trigger for automatic notification (triggered action) to the system operating method 100.

S110 may additionally or alternatively include detecting an authentication attempt in any manner (e.g., via notification by the authenticating user, via notification by an endpoint management system). Accordingly, while the above examples of how detecting an authentication attempt or access attempt are described, various other manners and examples of detecting an authentication attempt may be derived from this disclosure. For instance, a combination of the examples and methods disclosed therein may be used to achieve the detection of an authentication attempt. As an example, an independent service operating between or over the top of an endpoint and systems and computing resources (e.g., network, etc.) of an organization may first detect network traffic indicating a potential authentication attempt and the authentication attempt may be confirmed directly by the organization based on a confirmation request from the independent service or indirectly, based on a re-direction of an authentication request from the endpoint that was originally sent to the organization that is subsequently sent from the organization to the independent service.

S110 may occur at any stage of authentication. For example, S110 may include detecting an authentication attempt as soon as an endpoint begins authentication (e.g., submission of login credentials) or as soon as it is determined that an endpoint has accessed an authentication website or portal. As a second example, S110 may include detecting an authentication attempt only after one or more stages of an authentication process have been successfully completed (e.g., after verification of endpoint-submitted login credentials). Likewise, S110 may occur in response to satisfaction of certain authentication conditions (e.g., as defined by administrator policy). For example, the system operating the method 100 may only receive/detect authentication attempts for authentication attempts related to high-security accounts or access. As a second example, the system operating the method 100 may only receive/detect authentication attempts for authentication attempts from previously unknown endpoints or indeterminate endpoints. An endpoint may be considered to be indeterminate if the system operating method 100 or 200 cannot readily determine whether an endpoint is a managed or an unmanaged device. Such policy could be implemented in a number of ways (e.g., the iframe agent only transmits authentication attempt data after analysis of the authentication attempt to verify that it satisfies authentication conditions that require endpoint management classification).

The authentication attempt data collected in S110 preferably includes identifying information of the endpoint originating the authentication attempt. This identifying information preferably includes an IP address of the endpoint (enabling communication with the endpoint by the system operating the method 100), but may additionally or alternatively include any other endpoint information. For example, authentication attempt data may include data collected from a user-agent header. A user-agent header might read as follows: Mozilla/5.0 (Macintosh; Intel Mac OS X 10_9_3) AppleWebKit/537.75.14 (KHTML, like Gecko) Version/7.0.3 Safari/7046A194A. Such a user-agent header could be used to determine the operating system, operating system version, browser, and browser version of an endpoint. Authentication attempt data may additionally or alternatively include data such as client TCP/IP configuration, OS fingerprint, wireless settings, hardware clock skew, client MAC address, etc.

Authentication attempt data may additionally or alternatively include any other data relevant to authentication including circumstances surrounding an authentication attempt and/or circumstances (e.g., location, known or unknown endpoint, etc.) surrounding the endpoint during the authentication attempt; for example, the time and/or date of authentication or authentication attempt, a number of times a user attempts to authentication, the user account for which authentication is requested, etc.

S120 includes determining endpoint management status. S120 functions to determine the endpoint management status of the endpoint originating the authentication attempt (detected in S110). S120 may additionally or alternatively function to collect management status indicia.

In a variation of a preferred embodiment, S110 may include detecting an access attempt in lieu of an explicit authentication attempt; in this variation, the method 100 may include allowing (or denying) an entity access to a resource based on endpoint management status without explicitly authenticating the entity.

The endpoint management status preferably specifies whether the endpoint is managed by an endpoint management system, but may additionally or alternatively include any information relating to endpoint management of the endpoint; for example, policies implemented by the endpoint management system and/or information about the endpoint provided by the endpoint management system (e.g., endpoint health).

In a variation of a preferred embodiment, S120 may include determining a management status of a plurality of endpoints accessing an organization's resources or operating on one or more networks of the organization. In such example, upon determining or identifying a management status (e.g., unmanaged, managed, unknown/unmanaged, etc.), S120 may function to present via a display (e.g., a graphical user interface) or present some indication of the management status of the plurality of endpoints using an interface (e.g., some output device, speaker, display screen, holograph, etc.). The presented indication of the management status of each of the plurality of endpoints may expressly illustrate those endpoints accessing or attempting to access the organization's resources that are unmanaged and that are managed. For instance, it may be identified that there are forty (40) endpoints accessing digital resources of an organization and of those 40 endpoints, it is identified that thirty-two (32) of the endpoints are managed (e.g., includes a management agent, etc.) and that eight (8) of the endpoints are unmanaged. S120 may provide a list of the managed and unmanaged endpoints and/or S120 may provide a visual illustration of each of the 40 endpoints together with their respective management status and identifiers. In this way, an administrator or the like may readily recognize an extent of the unmanaged endpoint devices attempting to access or accessing one or more of the digital resources of an organization and allow for one or more actions for mitigating potential vulnerabilities associated with the unmanaged devices. For instance, the endpoint management system may display all managed and unmanaged devices operating on an organization's network and enable an administrator to indicate which of the unmanaged devices that should be blocked or provided limited access to the network.

Additionally, or alternatively, the system implementing method 100 functions to enable access control capabilities at the graphical user interface so that an administrator or other user may be able to selectively limit or block the one or more unmanaged endpoint computing devices presented via the GUI.

In a first implementation of a preferred embodiment, S120 includes determining endpoint management status by analyzing cookies transmitted by the endpoint during authentication. The cookies transmitted by the endpoint may be small digital files that may be stored on the endpoint or within a web browser used by the endpoint having management status information included therein. Additionally, or alternatively, the cookies may be a one-time use cookie that may be used only one-time by the endpoint to provide management status information. Additionally, or alternatively, the cookie may be an ephemeral cookie that expires over time or after the cookie is provided to the endpoint management system. In some embodiments, the endpoint may transmit the one-time use cookie or the ephemeral cookie to the endpoint management system and upon verification of the one-time use cookie or the ephemeral cookie, the endpoint management system may generate a new one-time use cookie or a new ephemeral cookie for the endpoint and transmit the new one-time use cookie or the new ephemeral cookie to the endpoint to be used at a subsequent of future time (e.g., during another authentication attempt or access attempt). In one variation, after transmitting the one-time use cookie or the ephemeral cookie by the endpoint, the endpoint may generate a new one-time use cookie or a new ephemeral cookie, itself, using a cookie generator or generating device (e.g., CPU or cryptographic processor, etc.). The new one-time use cookie or the new ephemeral cookie may be generated using any cookie generation process and may be generated based on a shared cryptographic secret between the endpoint and the endpoint management system or based on an asymmetric or symmetric cryptographic key pairs. Because some cookies are susceptible to cloning or misappropriation by a malicious party or adversary, a technical benefit that may be achieved by generating a one-time use cookie or an ephemeral cookie is that the cookies can only be used once or otherwise, dissipate after use or over time, which reduces the possibility of attack by the malicious party. Additionally, if the endpoint management system detects duplicate or conflicting one-time use cookies or ephemeral cookies, this may automatically trigger one or more vulnerability remediation processes (e.g., triggering a warning, disabling access to endpoints, etc.) by the endpoint management system.

The cookies are preferably transmitted to the system operating the method 100 via the endpoint management system, but may additionally or alternatively be received by the system operating the method 100 directly (e.g., via use of the iframe previously mentioned), or in any other manner.

S120 preferably includes analyzing cookies for data that identifies an endpoint as managed by an endpoint management system (e.g., a particular number or code within the cookie, a cryptographic signature generated by the endpoint or by the endpoint management system, etc.). Note that endpoint identification may be unique (e.g., each endpoint managed by an endpoint management system may be uniquely identifiable), alternatively, endpoint identification may be non-unique (e.g., all of the endpoints managed by the endpoint management system share the same verification credentials). Additionally or alternatively, the cookie may contain any information relevant to endpoint management status as previously described. S120 preferably includes analyzing the cookie by comparing cookie data to data stored by the system implementing the method 100 (e.g., a particular signature may indicate that a device is managed by a particular endpoint management system), but may additionally or alternatively include analyzing the cookie in any manner; for example, S120 may include transmitting the cookie to the endpoint management system for analysis. As a second example, S120 may include collecting information from the cookie and transmitting that information to the endpoint management system for further analysis. If a suitable cookie is not found in S120, this may be an indication than an endpoint is not managed by the endpoint management system. It shall be understood that while in the above examples management status indicia, such as cookie information, may be transmitted during authentication or prior to the endpoint accessing some digital resource of a service provider (or other entity), the cookie information may be transmitted or requested by the endpoint management system at any time including once the endpoint has already accessed one or more digital resources or once the endpoint has been operating on a computer network of the service provider (or other entity).

In a second implementation of a preferred embodiment, S120 includes determining endpoint management status by analyzing HTTP headers and/or HTTP requests of the endpoint. Thus, in such second implementation, the management indicia comprise HTTP header or HTTP request data that may be used by the endpoint management system to determine a management status of the endpoint. For example, a managed endpoint may be modified to transmit information in HTTP headers (or otherwise in HTTP requests) that provides endpoint management status data (as described previously). This may be accomplished, for example, by endpoint management system software operating on the endpoint; alternatively, by a system daemon or browser extension communicatively coupled to the system operating the method 100, or in any other manner. Additionally, the endpoint may be triggered to modify the HTTP header or the HTTP request based on a receipt of a management status query or management status probe transmitted using an iframe and/or transmitted by the endpoint management system to the endpoint, as discussed in more detail below. Otherwise, in such embodiments, if not modification trigger is received by the endpoint, the endpoint device may continue to transmit the HTTP headers and the like without modification. Similar to cookies, HTTP headers may contain any data, identifiers, codes, and/or cryptographic signatures and may be analyzed in any manner by a suitable system.

In a third implementation of a preferred embodiment, S120 includes determining endpoint management status by analyzing digital certificates (e.g., X.509 certificates) transmitted by the endpoint during authentication. The digital certificates are preferably transmitted to the system operating the method 100 via the endpoint management system, but may additionally or alternatively be received by the system operating the method 100 directly (e.g., via use of the iframe previously mentioned), or in any other manner. Similar to cookies, S120 preferably includes analyzing digital certificates for data that identifies an endpoint as managed by an endpoint management system (e.g., verifying that a certificate is issued by an authority of the endpoint management system). Certificates may be linked, by their issuing authority, to any information relevant to endpoint management status as previously described.

The digital certificates may be installed on an endpoint and/or a web browser accessible to the endpoint. If the certificate is installed, the web browser may transmit the certificate upon request by a HTTP server or the like that is managed by the service provider or organization. A technical advantage of using a digital certificate, such as X.509 or the like, is that the digital certificate may be difficult or impossible to extract from an operating system of an endpoint and thus, these digital certificates typically cannot be cloned allowing for reuse of the digital certificate by the endpoint in management status determination.

In a fourth implementation of a preferred embodiment, S120 includes querying an endpoint (Application Programming Interface) API to determine endpoint management status. For example, Windows 10 includes a built-in API for remote attestation, authorization, and health check. In this fourth implementation, S120 may include querying the endpoint API for any endpoint management status data (e.g., management status indicia) as previously described. In response to the query, the endpoint API may automatically transmit the request endpoint management status data. Note that this API may in some cases enable endpoint management status to be requested from a remote service without any direct interaction with the endpoint; in other cases, an endpoint API may require direct interaction with an endpoint (and potentially even that a host agent or browser extension, etc. be installed on said endpoint).

In a fifth implementation of a preferred embodiment, S120 includes determining endpoint management status by collecting management status indicia form the endpoint at an iframe. For example, collecting management status indicia from the endpoint can include: querying the endpoint user device from the iframe; and in response to querying the endpoint user device, receiving the management status indicia from the endpoint user device. Actively collecting management status indicia at an iframe can include transmitting management status indicia probes to request endpoint management status indicia from one or more entities including: a third party application operating on the user device, a native application, the user associated with the user device (e.g., transmitting a notification to the user endpoint device asking for a response by the user), a service associated with the user device (e.g., a security service, a two-factor authentication service, customer service, communication service, payroll service), a server, another network, and/or any suitable entity. Active collection of management status indicia can be performed at specified time intervals (e.g., every day, week, month, etc.), under enumerated conditions (e.g., during an authentication process for a user attempting to access a service, when a user device attempts to access a network through a web application with an embedded iframe), manually (e.g., initiated by an administrator, by a user, etc.), and/or in any suitable manner. Additionally, the management status indicia probes can be used to search the endpoint for management status information at likely storage locations of such information. Upon identification of management status indicia at the endpoint by the management status indicia probes, the probes may retrieve the management status indicia and carry the management status indicia back to the source of the probes (e.g., the iframe, the management status system, etc.). Additionally, or alternatively, the receipt of the management status indicia probes by the endpoint may trigger the generation and/or transmission of the management status indicia by the endpoint.

In the fifth implementation, iframe collection of management status indicia may additionally or alternatively include performing other web-based interrogation techniques. For example, iframe collection may include querying a navigator.plugins javascript object to detail the cookies installed in the endpoint browser (e.g., Java, Flash, etc.) potentially including management status indicia. iframe collection may include any method of querying an endpoint through the embedded interface; as another example, iframe collection may be used to determine details about a user's internet connection (e.g., IP address). iframe collection may also include collecting information from locally shared objects (e.g., flash cookies) or from browser plug-ins (e.g., OS plugins for remote support). However, any suitable endpoint data can be collected with iframe collection. However, actively collecting endpoint management status indicia at the iframe can be otherwise performed.

Note that while these implementations describe various techniques to determine endpoint management status, the method 100 may additionally include any distribution or other setup required to operate the aforementioned techniques and including various other system components for implementing such techniques.

For example, the method 100 may include running a script that distributes cookies across managed endpoints by inserting a special identifying value into the cookie store of a specific origin/hostname for the browsers installed on that system. For example, the cookie could contain "acmecorp-bob-laptop1" and include a cryptographic signature attesting to its authenticity and the script pushed through the endpoint management system would go modify the SQLite database used by Chrome operating system to store the cookies for "api-acmecorp.duosecurity.com". In this example, this cookie would then be transmitted as part of HTTP requests to the acmecorp API URL at Duo Security (which in this example analyzes the cookies). The script may be provisioned to the endpoint any point in which the endpoint management system has access to the endpoint or may be in operable communication with the endpoint. For example, the script may be provisioned at an initial set up of the endpoint, while the endpoint is operating on a computing network of the service provider (or other entity), or even while the endpoint is not connected to a computing network of the service provider but having an operable communication line between the endpoint and the endpoint management system.

As a second example, the method 100 may include transmitting a browser plugin to the endpoint management system, which then pushes the browser plugin to managed endpoints, causing modification of HTTP headers. In such example, the browser plugin functions as a trigger with modification data for triggering the modification of the HTTP headers.

As a third example, the method 100 may include generating certificates and transmitting these certificates to the endpoint management system, which then pushes them to managed endpoints. Upon receipt of the certificates by the endpoints, the endpoints may securely store the certificates in one or more locations known to the endpoint management system, which allows the endpoint management system to configure management status indicia probes that function to retrieve the certificate during an access attempt by the endpoint.

Additionally, or alternatively, the method 100 may include performing setup for endpoint management status determination and distribution of endpoint management status indicia in any manner.

The method 100 may additionally include managing the setup for endpoint management status determination in any manner; for example, by refreshing certificates, cookies, and/or HTTP header modifications in response to expiration of a set time period (e.g., every 12 hours for certificates with a 24 hour expiration time) and/or to satisfaction of some dynamic condition (e.g., suspected system breach) or predetermined condition (e.g., access policy).

As another example, the method 110 may include analyzing endpoint management status data for evidence of credential spoofing/cloning. For example, if the same cookie is used twice by endpoints submitting different user-agent data, this may be indicative of credential spoofing. If credential spoofing/cloning is detected or suspected, the method 110 may include taking action to limit damage or mitigate the computer security risks associated with the spoofed/cloned credentials (e.g., denying authentication, notifying administrators, updating credentials, etc.). Such detection may additionally trigger a refresher of all existing management status indicia at each of the endpoints managed by the endpoint management system.

S130 includes transmitting endpoint management status data. S130 functions to transmit data regarding the endpoint management status of an endpoint (determined in S120) to a relevant entity; preferably the service provider or other entity at which authentication is requested. Additionally or alternatively, this data may be transmitted to the endpoint itself (for example, S130 may include transmitting encrypted endpoint management status data to an endpoint that in turn forwards it to the service provider).

Endpoint management status data preferably includes an indication of whether an endpoint is managed or not, but may additionally or alternatively include any data relevant to endpoint management as previously described. This may be used, for example, by a service provider to determine if (and/or to what extent) authentication should be granted to an endpoint.

Additionally or alternatively, S130 may include transmitting authentication recommendations to the service provider based on administrator-set policy. For example, S130 may include determining that an endpoint satisfies some set of management criteria and transmitting a recommendation to the service provider that authentication be granted. As second example, S130 include determining that an endpoint satisfies a different set of management criteria and transmitting a recommendation to the service provider that authentication be granted only after additional authentication (e.g., second factor authentication) is performed. In this second example, once or if the endpoint is granted access after the additional authentication, the endpoint management system may function to require or provision the endpoint with management status indicia.

S140, which includes initializing protective protocols to reduce potential security vulnerabilities, functions to modify the computer network or digital resources of the service provider (or other entity) and/or modify the endpoint device attempting to access the computer network or digital resources.

In response to identifying a management status of the endpoint, S140 may function to implement one or more controls that modify the accessibility of the resources of the service provider by the endpoint. For instance, S140 may limit or completely block the resources accessible by endpoint that is considered to be unmanaged.

Additionally, or alternatively, in response to determining a management status of the endpoint, S140 may function to configure the endpoint from an unmanaged device to a managed device using one or more aspects of the method 200. S140 may perform such transformation or reconfiguration of the endpoint in the case that the endpoint successfully authenticates, itself or the user, but has not previously been configured with management status indicia. Thus, S140 may function to provide a capability to the endpoint to generate management status indicia or alternatively, provide the endpoint with management status indicia. As an example, when a system operating method 100 determines that the endpoint is unmanaged (but successfully authenticated), the system may generate management status configuration indicia for the endpoint, transmit the management status indicia to the endpoint, and confirm or verify that the endpoint computing device is configured as a managed endpoint based on implementing the management status configuration indicia at the endpoint. The management status configuration indicia may be any information that allows an endpoint to configure itself as a managed device. Thus, the management status configuration indicia may include computer-executable instructions for modifying or configuring systems of the endpoint like a managed device, a management script or management software application that is installed on the endpoint, digital certificates, instructions for modifying HTTP headers or requests, and the like.

2. Method for Endpoint-Classification-Based Authentication

Figure 3:
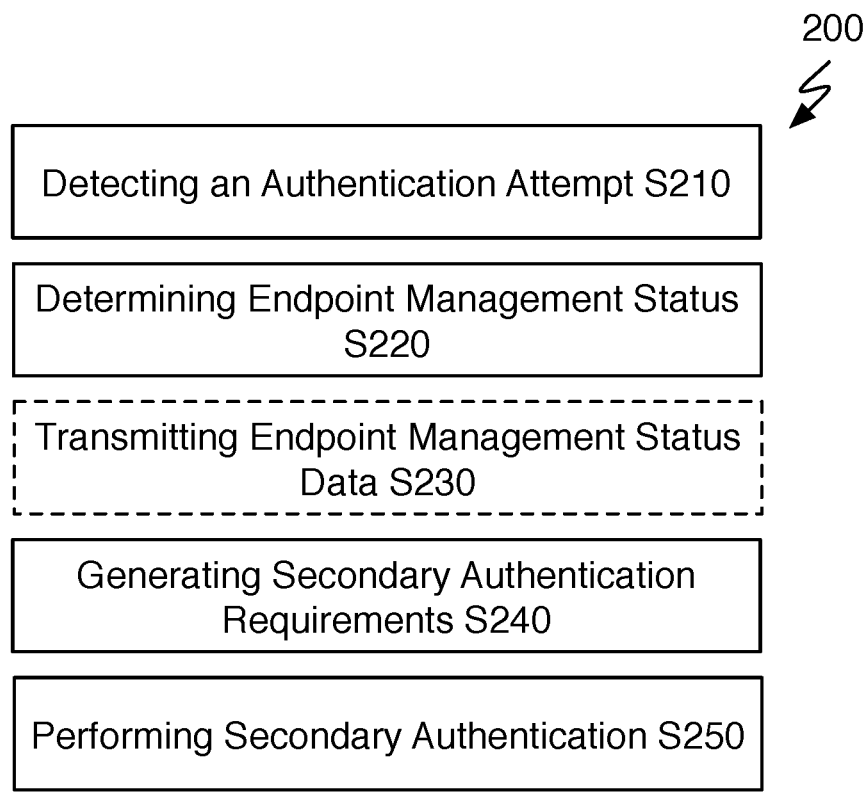
FIG. 3 is a chart view of a method of a preferred embodiment.

A method 200 for endpoint-classification-based authentication includes detecting an authentication attempt S210, determining endpoint management status S220, generating secondary authentication requirements S240, and performing secondary authentication S250, as shown in FIG. 3. The method 200 may additionally or alternatively include transmitting endpoint management status data S230.

As previously discussed, endpoint management status may be useful to determine to what extent an endpoint should be allowed access to a service or other resource. As the method 100 is preferably implemented externally to a service provider, it can be integrated into an authentication flow also external to the service provider, such as that of the multi-factor authentication platform described in U.S. Pat. No. 8,510,820, the entirety of which is incorporated by this reference. Such an integration may allow for the modification or control of authentication without directly requiring cooperation of the service provider (e.g., by controlling whether second factor authentication is granted, by controlling access by the endpoint to the computer network, etc.).

The method 200 preferably utilizes endpoint management status to manage secondary authentication, allowing for a complete security management solution without requiring the service provider (where primary authentication is preferably performed) to implement policy dependent on endpoint management status.

This is particularly useful in that a multi-factor authentication platform may be used across a wide variety of services; instead of requiring all of those services to be configured to be responsive to endpoint management status, the method 200 may enable responsive authentication by configuring the authentication platform (which may be used by multiple different services).

Figure 4:
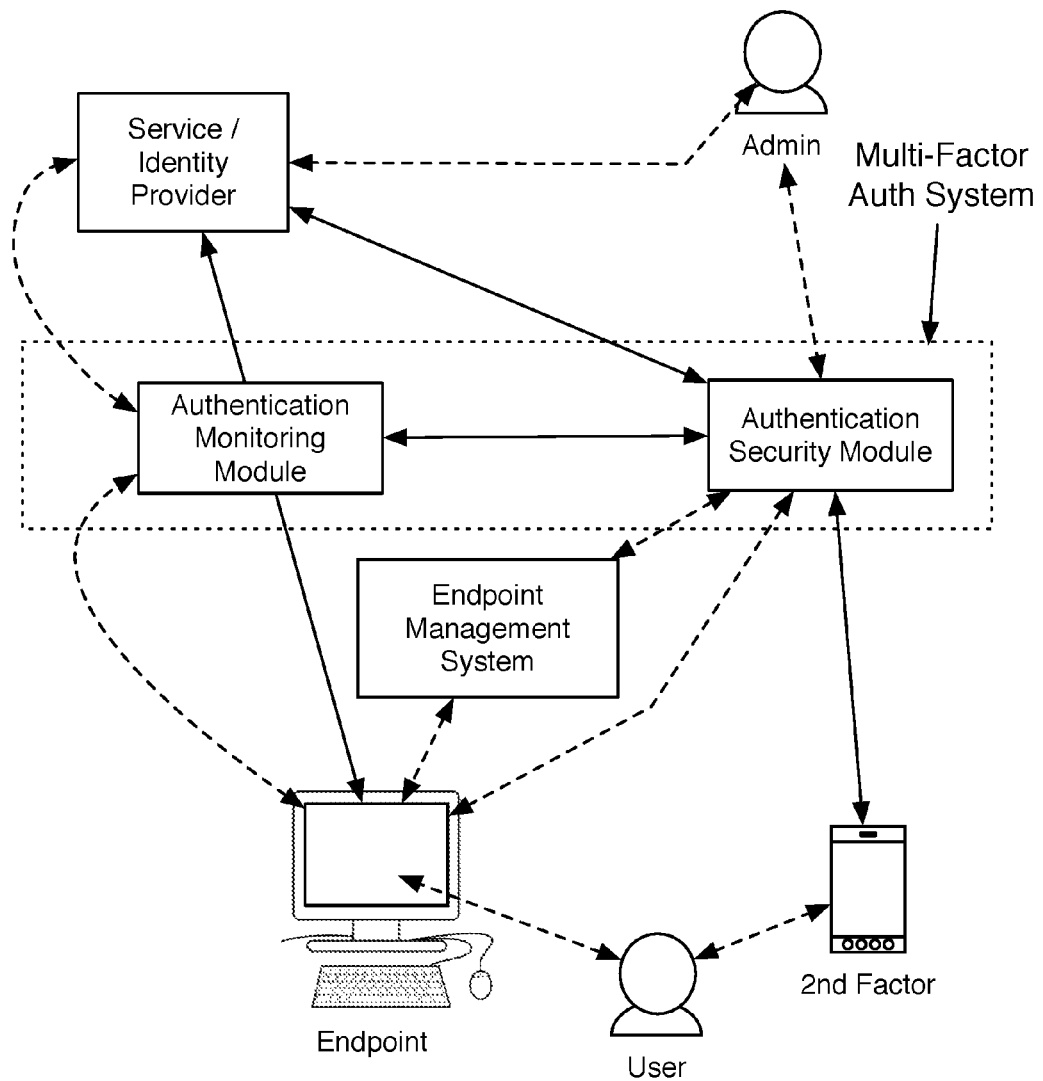
FIG. 4 is a diagram view of a multi-factor authentication platform comprising an endpoint classification system.

The method 200 is preferably implemented by a multi-factor authentication (MFA) platform that contains an endpoint classification system, as shown in FIG. 4. Such a system is preferably substantially similar to that of the endpoint classification system of the method 100, except in that the authentication security module controls multi-factor authentication in addition to the duties of the endpoint classification system of the method 100.

The method 200 may additionally or alternatively be implemented by any suitable system capable of performing the method 200.

S210 includes detecting an authentication attempt. S210 is preferably substantially similar to S110; however, S210 may include detecting an authentication attempt by receiving a request from a service provider to perform secondary authentication for a given authentication attempt.

S220 includes determining endpoint management status. S220 is preferably substantially similar to S120; however, note that the same data collection techniques used for determining endpoint management status may be used for performing secondary authentication. For example, iframe collection may leverage the existence of iframes used for performing multi-factor authentication. In such a case, the same embedded frame used for performing multi-factor authentication (or enrolling devices for MFA, managing authentication devices for MFA, providing feedback on MFA processes, etc.) may also be used for determining endpoint management status. In this way, iframe collection allows endpoint management status data to be collected without requiring explicit backend service integration. Alternatively, different iframes embedded within a same embedded interface host (e.g., a same web application) can be used for collecting endpoint management status data and for authentication.

Additionally, or alternatively, when S220 determines management status indicia or information that may be stale (e.g., exceeding an expiry), potentially compromised, or otherwise, provided under suspicious circumstances (e.g., unknown IP address, strange time/date, etc.), S220 may automatically trigger additional authentication requires (e.g., secondary authentication).

S230 includes transmitting endpoint management status data. S230 is preferably substantially similar to S130; however, note that S230 is optional. In some implementations of the method 200, it may not be necessary to transmit endpoint management status data to the service provider (e.g., in implementations where endpoint management status data is used to determine secondary authentication and is not directly used in primary authentication by the service provider).

S240 includes generating secondary authentication requirements. S240 functions to generate the requirements for authentication of a given transaction based on endpoint management status data (determined in S220) and authentication policy (set at the authentication platform, the possession factor, etc.). S240 may additionally or alternatively utilize other data collected by the MFA platform; for example, transaction data collected in S210.

The authentication requirements generated in S240 preferably specify endpoint management standards required for an endpoint to successfully complete secondary factor authentication. Alternatively, the authentication requirements may specify level/type of authentication required for a given transaction (or for a set of transactions) in any manner. For example, if an endpoint is managed, secondary factor authentication may not be required; while if an endpoint is unmanaged, secondary factor authentication may be required (to access the service provider or one or more digital resources of the service provider). As another example, for endpoints not satisfying a set of endpoint management standards (e.g., the endpoint is managed and the management satisfies a set of security standards), authentication (e.g., biometric authentication or a tertiary authentication) may be required in addition to secondary authentication (e.g., via a possession factor); while for the endpoints satisfying that set of endpoint management standards, only secondary factor authentication may be required.

S240 preferably includes setting conditions that determine, for a given transaction, how secondary factor authentication is to be performed. In addition to the type of authentication specified above, S240 may additionally or alternatively specify conditions that trigger other actions (e.g., notification of unmanaged device access attempts to a service provider, and/or to the authentication platform) related to authentication. These conditions are preferably based on endpoint management status. Thus, the conditions may be based on whether the data associated with the endpoint management status indicates valid or stale endpoint management status information, whether the management status information is comprised (e.g., spoofed), and the like. It shall be understood that the conditions may be any type of conditions derived from the endpoint management status.

S250 includes performing secondary authentication. S250 functions to, based on the authentication requirements generated in S240, authenticate (or attempt to authenticate) a transaction in response to the authentication request.

S250 may include one or more of performing automatic authentication, user-interactive authentication, additional-auth authentication, automatically denying authentication, and modifying authentication policy, as described in U.S. Provisional Patent Application No. 62/344,512, the entirety of which is incorporated by this reference. While these authentication techniques are preferably substantially similar to those in the cited reference, S250 preferably includes performing secondary authentication in response to endpoint management status and the authentication requirements of S240 (rather than, or in addition to, possession factor confidence levels, as described in the cited reference). For example, performing secondary authentication may only be triggered if there is sufficient and/or valid endpoint management status and that the endpoint management status was sufficient for generating authentication requirements by the system implementing method 200.

The methods of the preferred embodiment and variations thereof can be embodied and/or implemented at least in part as a machine configured to receive a computer-readable medium storing computer-readable instructions. The instructions are preferably executed by computer-executable components preferably integrated with an endpoint classification system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for mitigating security vulnerabilities of a computer network by detecting a management status of an endpoint computing device attempting to authenticate to one or more computing resources accessible via the computer network, the method comprising:
    at a computer security platform comprising one or more servers that function to:
        (i) detect an authentication attempt by the endpoint computing device to the computer network, wherein detecting the authentication attempt comprises receiving an authentication request originating from the endpoint computing device for accessing the computer network;
        (ii) during the authentication attempt, collect management status indicia from the endpoint computing device, wherein the management status indicia comprise data used to determine a management status of the endpoint computing device, the management status indicating whether the endpoint computing device is actively managed by an entity maintaining the computer network or by an affiliate of the entity maintaining the computer network, wherein collecting management status indicia from the endpoint computing device includes:
            implementing at least one inline frame within a web interface; and
            using the at least one inline frame to collect (a) authentication attempt data and (b) the management status indicia during the authentication attempt, wherein the authentication attempt data comprises identifying data of the endpoint computing device and authentication credentials;
        (iii) use the management status indicia to identify the management status of the endpoint computing device and identifying the management status of the endpoint computing device; and
        (iv) control access to the computer network based on (a) whether the authentication attempt by the endpoint computing device is successful and (b) the identified management status of the endpoint computing device.

2. The method of claim 1, wherein using the at least one inline frame to collect the management status indicia includes:
    using the inline frame to transmit to the endpoint computing device one or more management status indicia probes seeking management status indicia from the endpoint computing device.

3. The method of claim 1, wherein the management status indicia comprise a non-response or inadequate response from the endpoint computing device;
    wherein identifying the management status of the endpoint computing device includes identifying that the endpoint computing device comprises an unmanaged device based on the non-response or inadequate response; and
    wherein controlling access by the endpoint computing device to the computer network includes blocking or limiting access of the unmanaged endpoint computing device to the computer network.

4. The method of claim 1, wherein identifying the management status of the endpoint computing device includes identifying that the endpoint computing device comprises an unmanaged device based on the management status indicia;
    wherein at the computer security platform further functions to:

configure the endpoint computing device to a managed endpoint computing device, wherein configuring the endpoint computing device includes:
- (a) generating management status configuration indicia for the endpoint computing device;
- (b) transmitting the management status configuration indicia to the endpoint computing device; and
- (c) confirming that the endpoint computing device is configured as the managed endpoint computing device based on implementation of the management status configuration indicia at the endpoint computing device.

5. The method of claim 1, wherein identifying the management status of the endpoint computing device includes identifying that the endpoint computing device comprises an unmanaged device or an indeterminate device based on the management status indicia;
wherein at the computer security platform further functions to:
in response to identifying the endpoint computing device as the unmanaged device or the indeterminate device, referencing access policy associated with the computer network;
wherein controlling access to the computer network if further based on (c) the access policy.

6. The method of claim 1, wherein collecting management status indicia from the endpoint computing device includes:
at a proxy service comprising one or more remote computing servers and that is positioned operably between the endpoint computing device and the entity or the affiliate of the entity that maintains the computer network:
monitoring network traffic passing through the proxy service to collect authentication attempt data and management status indicia from the endpoint computing device.

7. The method of claim 1, wherein the management status indicia comprise cookies transmitted by the endpoint computing device to the computer security platform,
wherein identifying the management status of the endpoint computing device includes:
- (a) analyzing the cookies to identify management status data, wherein the management status data relates to information useable by the computer security platform to verify the management status of the endpoint computing device;
- (b) comparing the management status data to stored endpoint management data; and
- (c) determining the management status of the endpoint computing device based on results of the comparison.

8. The method of claim 7, wherein the cookies transmitted by the endpoint computing device comprise one or more of ephemeral cookies and one-time use cookies, wherein the cookies expire after a predetermined period of time, and wherein the one-time use cookies can only be used or transmitted one time by the endpoint computing device.

9. The method of claim 1, wherein the management status indicia comprise HTTP headers and/or HTTP requests transmitted by the endpoint computing device to the computer security platform,
wherein identifying the management status of the endpoint computing device includes:
- (a) analyzing the HTTP headers and/or the HTTP requests to identify management status data, wherein the management status data relates to information useable by the computer security platform to verify the management status of the endpoint computing device;
- (b) comparing the management status data from the HTTP headers and/or the HTTP requests to stored endpoint management data; and
- (c) determining the management status of the endpoint computing device based on results of the comparison.

10. The method of claim 9, wherein if the endpoint computing device comprises a managed endpoint:
prior to transmitting the HTTP headers and/or the HTTP requests, using a software application operating on the endpoint computing device to modify the HTTP headers and/or the HTTP requests to include the management status data.

11. The method of claim 1, wherein the management status indicia comprise a digital certificate transmitted by the endpoint computing device to the computer security platform, wherein the digital certificate is provided to the endpoint computing device by an issuing authority,
wherein identifying the management status of the endpoint computing device includes:
- (a) analyzing the digital certificate to identify management status data, wherein the management status data relates to information useable by the computer security platform to verify the management status of the endpoint computing device;
- (b) comparing the management status data from the digital certificate to stored endpoint management data; and
- (c) determining the management status of the endpoint computing device based on results of the comparison.

12. The method of claim 1, wherein collecting the management status indicia includes:
querying an endpoint application programming interface (API) of the endpoint computing device for the management status indicia, the query comprising a request to the endpoint API to transmit the management status indicia;
wherein identifying the management status of the endpoint computing device includes analyzing a response from the endpoint API to the query.

13. The method of claim 1, wherein at the computer security platform further functions to:
transmit the management status data of the endpoint computing device to the entity maintaining the computer network or to the affiliate of the entity that maintains the computer network, wherein the management status data includes an indication of whether the endpoint computing device comprises a managed device or an unmanaged device.

14. The method of claim 1, wherein at the computer security platform further functions to:
present via a graphical user interface (GUI) a plurality of endpoint computing devices accessing the computer network or one or more digital resources accessible via the computer network;
identify a management status for each of the plurality of endpoint computing device presented via the GUI, wherein the management status comprises managed device indicator or unmanaged device indicator, and wherein the plurality of endpoints comprises one or more managed endpoint computing devices and one or more unmanaged endpoint computing devices; and enable access control capabilities to selectively limit or block the one or more unmanaged endpoint computing devices from accessing the computer network.

15. A method for mitigating security vulnerabilities of a computer network by detecting a management status of an endpoint computing device attempting to authenticate to one or more computing resources accessible via the computer network, the method comprising:
at a computer security platform comprising one or more servers that function to:
(i) detect an authentication attempt by the endpoint computing device to the computer network, wherein detecting the authentication attempt comprises receiving an authentication request originating from the endpoint computing device for accessing the computer network;
(ii) during the authentication attempt, collect management status indicia from the endpoint computing device, wherein the management status indicia comprise data used to determine a management status of the endpoint computing device, the management status indicating whether the endpoint computing device is actively managed by an entity maintaining the computer network or by an affiliate of the entity maintaining the computer network, wherein the management status indicia comprise cookies transmitted by the endpoint computing device to the computer security platform;
(iii) use the management status indicia to identify the management status of the endpoint computing device and identifying the management status of the endpoint computing device, wherein identifying the management status of the endpoint computing device includes:
(a) analyzing the cookies to identify management status data, wherein the management status data relates to information useable by the computer security platform to verify the management status of the endpoint computing device;
(b) comparing the management status data to stored endpoint management data; and
(c) determining the management status of the endpoint computing device based on results of the comparison; and
(iv) control access to the computer network based on (a) whether the authentication attempt by the endpoint computing device is successful and (b) the identified management status of the endpoint computing device.

16. The method of claim 15, wherein the cookies transmitted by the endpoint computing device comprise one or more of ephemeral cookies and one-time use cookies, wherein the cookies expire after a predetermined period of time, and wherein the one-time use cookies can only be used or transmitted one time by the endpoint computing device.

17. A method for mitigating security vulnerabilities of a computer network by detecting a management status of an endpoint computing device attempting to authenticate to one or more computing resources accessible via the computer network, the method comprising:
at a computer security platform comprising one or more servers that function to:
(i) detect an authentication attempt by the endpoint computing device to the computer network, wherein detecting the authentication attempt comprises receiving an authentication request originating from the endpoint computing device for accessing the computer network;
(ii) during the authentication attempt, collect management status indicia from the endpoint computing device, wherein the management status indicia comprise data used to determine a management status of the endpoint computing device, the management status indicating whether the endpoint computing device is actively managed by an entity maintaining the computer network or by an affiliate of the entity maintaining the computer network, wherein the management status indicia comprise HTTP headers and/or HTTP requests transmitted by the endpoint computing device to the computer security platform;
(iii) use the management status indicia to identify the management status of the endpoint computing device and identifying the management status of the endpoint computing device, wherein identifying the management status of the endpoint computing device includes:
(a) analyzing the HTTP headers and/or the HTTP requests to identify management status data, wherein the management status data relates to information useable by the computer security platform to verify the management status of the endpoint computing device;
(b) comparing the management status data from the HTTP headers and/or the HTTP requests to stored endpoint management data; and
(c) determining the management status of the endpoint computing device based on results of the comparison; and
(iv) control access to the computer network based on (a) whether the authentication attempt by the endpoint computing device is successful and (b) the identified management status of the endpoint computing device.

18. The method of claim 17, wherein if the endpoint computing device comprises a managed endpoint:
prior to transmitting the HTTP headers and/or the HTTP requests, using a software application operating on the endpoint computing device to modify the HTTP headers and/or the HTTP requests to include the management status data.

* * * * *